US008621226B1

(12) United States Patent
Hackborn et al.

(10) Patent No.: US 8,621,226 B1
(45) Date of Patent: *Dec. 31, 2013

(54) SELF-SIGNED CERTIFICATES FOR COMPUTER APPLICATION SIGNATURES

(75) Inventors: Dianne K. Hackborn, Santa Clara, CA (US); David P. Bort, Palo Alto, CA (US); Joseph M. Onorato, Cambridge, MA (US); Dan Bornstein, San Francisco, CA (US); Andrew T. McFadden, Sunnyvale, CA (US); Brian J. Swetland, Mountain View, CA (US); Richard G. Cannings, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,652

(22) Filed: Sep. 30, 2011

Related U.S. Application Data

(63) Continuation of application No. 12/858,359, filed on Aug. 17, 2010.

(60) Provisional application No. 61/234,590, filed on Aug. 17, 2009.

(51) Int. Cl.
*H04L 9/32* (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS 6,473,508 B1 * 10/2002 Young et al. .................... 380/30
2004/0250062 A1 * 12/2004 Douglas ......................... 713/156
2005/0065799 A1 * 3/2005 Dare et al. ........................ 705/1
2008/0010455 A1 * 1/2008 Holtzman et al. ............ 713/168
2008/0010458 A1 * 1/2008 Holtzman et al. ............ 713/175

OTHER PUBLICATIONS

Jesse Burns et al, Developing Secure Mobile Applications for Android, Oct. 2008, ISEC, pp. 1-28.*

* cited by examiner

*Primary Examiner* — Teshome Hailu
(74) *Attorney, Agent, or Firm* — Fish & Richardson P.C.

(57) ABSTRACT

A computer-implemented method for signing computer applications is disclosed. The method includes generating a compiled version of a first software application, signing the first software application with a digital certificate locally to a developer of the first software application without assistance from a central certification authority, and submitting the signed first software application to an on-line application store.

16 Claims, 8 Drawing Sheets

SELF-SIGNED CERTIFICATES FOR COMPUTER APPLICATION SIGNATURES

CROSS-REFERENCE TO RELATED APPLICATION

This application is a continuation of and claims priority to U.S. application Ser. No. 12/858,359, filed on Aug. 17, 2010, which claims priority to U.S. Provisional Application Ser. No. 61/234,590, filed on Aug. 17, 2009. The contents of the prior applications are incorporated herein by reference in their entirety.

TECHNICAL FIELD

This document relates to systems and techniques for signing computer applications with signatures produced by self-signed certificates whose private keys are controlled by developers of the respective applications.

BACKGROUND

A well-behaved computer system should allow various programs to interoperate with each other on the system while at the same time protecting good programs, and their data, from malicious programs such as spyware. For example, a good system should take efforts to prevent a spyware program from accessing confidential information about a user, or from logging keystrokes that the user may enter into the computer (e.g., in an effort to obtain the user's personal information). However, distinguishing "good" programs from "bad" can be a real challenge. One mechanism by which such a distinction can be made is by use of trusted third parties that verify that a particular software developer is legitimate, such as by checking public records concerning the developer. The third party, known generally as a certification authority or certifying authority, may then assign the developer a cryptographic key that is private to the developer and that the developer can use to sign its applications. The signing creates a public key that users of the program can see, and can thus use to verify that the developer is legitimate. The programs or the operating system on a computing device can also use such certificates to determine the level of access to provide to an application.

SUMMARY

This document describes systems and techniques that provide security for computer applications. In certain implementations, such security may be provided by attaching signatures from electronic certificates to the applications, so that a user or another application knows to trust the signed applications. Such certificates may be provided by the application developer itself, rather than from a certification authority. Although such an application signed with a signature produced from a self-signed certificate may be less trustworthy than a centrally authenticated certificate, it will at least be trustworthy to other applications that have been generated by the same developer, and that have thus been signed using the same private key.

In one implementation, a computer-implemented method for self-signing computer applications is disclosed. The method comprises generating a compiled version of a first software application, signing the first software application with a digital certificate locally to a developer of the first software application without assistance from a central certification authority, and submitting the signed first software application to an on-line application store. The certificate itself can be self-signed by the developer or someone in cooperation with the developer other than a central authority for providing certificates. Signing the first software application can comprise selecting a signing option from an application development environment. Also, signing the first software application can comprise signing the application using a third party certificate-generating application that is resident on the same computer as the first software application. The method may also comprise generating a second compiled version of the software application, signing the second compiled version of the software application using the digital certificate, and submitting the second compiled version of the software application to the on-line application store. The second compiled version of the software application can have an identifier that matches an identifier for the first compiled version of the software application.

In some aspects, the method also includes generating a compiled version of a second software application, signing the second software application with the digital certificate locally to the developer of the first software application without assistance from a central certification authority, and submitting the signed second software application to the on-line application store. The first software application can include code to determine whether a certificate for the first application matches a certificate for other applications, and to limit access to data controlled by the first application to other applications whose certificate matches the certificate for the first application.

In another implementation, a computer-implemented method for controlling access to computer resources using computer applications signed using one or more self-signed certificates comprises instantiating a first application in a first process on a computing device, receiving a request to instantiate a second application in the first process, determining whether the first application and the second application were signed by the same self-signed electronic certificate that was created without assistance from a certifying authority, and running the second application in the process if the first application and second application are determined to have been signed by the same self-signed electronic certificate.

In some aspects, the method also comprises preventing the second application from running in the process if the first application and second application are determined to not have been signed by the same self-signed electronic certificate. Running the second application in the process can comprise upgrading the first application to the second application while maintaining data that is accessible only to applications that have been signed with the certificate. Also, access to the process can be controlled by a management component of an operating system operating on a device that hosts the process. The method can also include determining whether the first application has declared functional permissions for the first process, wherein running the second application in the process further comprises determining whether the second application has been granted functional permissions for the process. In addition, granting functional permissions can be performed by a user upon installation of the second application.

In yet another implementation, a computing device having structures for controlling access to computer resources using computer applications signed using self-signed certificates is disclosed. The system comprises one or more computer applications each signed with a self-signed security certificate and stored on a computing device, and an operating system operable on the computing device to provide resources for executing the one or more computer applications, wherein the operating system includes one or more components to control access by a first application to resources controlled by a second application based on the presence of a match between electronic security certificates with which the first and second application are signed. The one or more components can be programmed to determine whether the first application and the second application were signed by the same self-signed electronic certificate that was created without assistance from a certifying authority; and to allow the second application to run in a process assigned to the first application only if the first application and second application are determined to have been signed by the same self-signed electronic certificate.

In some aspects, the one or more components are programmed to permit the second application to run in the process to upgrade and remove the first application, while maintaining data that is accessible only to applications that have been signed with the certificate. The one or more components can also be programmed to permit the first application and the second application to run in the process simultaneously. In addition, the match can be partial, and access by the first application to resources controlled by the second application can be enforced without prompting a user of the computing device.

In another implementation, a computing device having structures for controlling access to computer resources using computer applications signed using self-signed certificates comprises one or more computer applications each signed with a self-signed security certificate and stored on a computing device, one or more data stores storing data accessible by the one or more computer applications, and means for controlling access to computer resources by determining whether a first application of the one or more computer applications is signed with a self-signed electronic security certificate that matches a self-signed security certificate of a second application.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

This document describes systems and techniques for providing a mechanism by which applications on a computing device can determine which other applications to trust. Malicious applications, such as computer viruses, adware, and spyware, may attempt to steal personal computer data or perform operations that would adversely impact a device user, the device operating system, or other applications. Thus, an operating system and applications hosted by the operating system may implement a security architecture to limit access to various computer functions (e.g., networking and communications capabilities, interaction with peripheral devices, power management, etc.) and personal data (e.g., e-mail, contact information, account numbers and passwords, etc.), based on the trustworthiness of other applications that may request access to the functions and data.

Traditionally, third-party certificate authorities have been used to verify the integrity of software applications and software developers. Generally, a software developer may generate a pair of keys, including a public key and a private key. The software developer may then provide the public key to a certificate authority and request a digital certificate. The certificate authority may check the credentials of the software developer and then generate, sign, and issue the requested certificate, provided the developer is determined to be trustworthy. The issued certificate may include the public key of the developer and additional identification information. Using the private key and the issued certificate, the software developer may sign applications, and users of the applications can be assured that the developer is authentic and has been investigated by the certificate authority.

The systems and techniques described in this document involve methods of providing and managing applications that have not been signed by a certificate from a certificate authority. In particular, software developers may sign their own applications using certificates they have signed, and applications that are signed and provided by the same developer may trust each other. This enables the developer to create a suite of interoperable applications, and enables the developer to update an application with a newer version or an extension module, to name a few possibilities.

Figure 1:
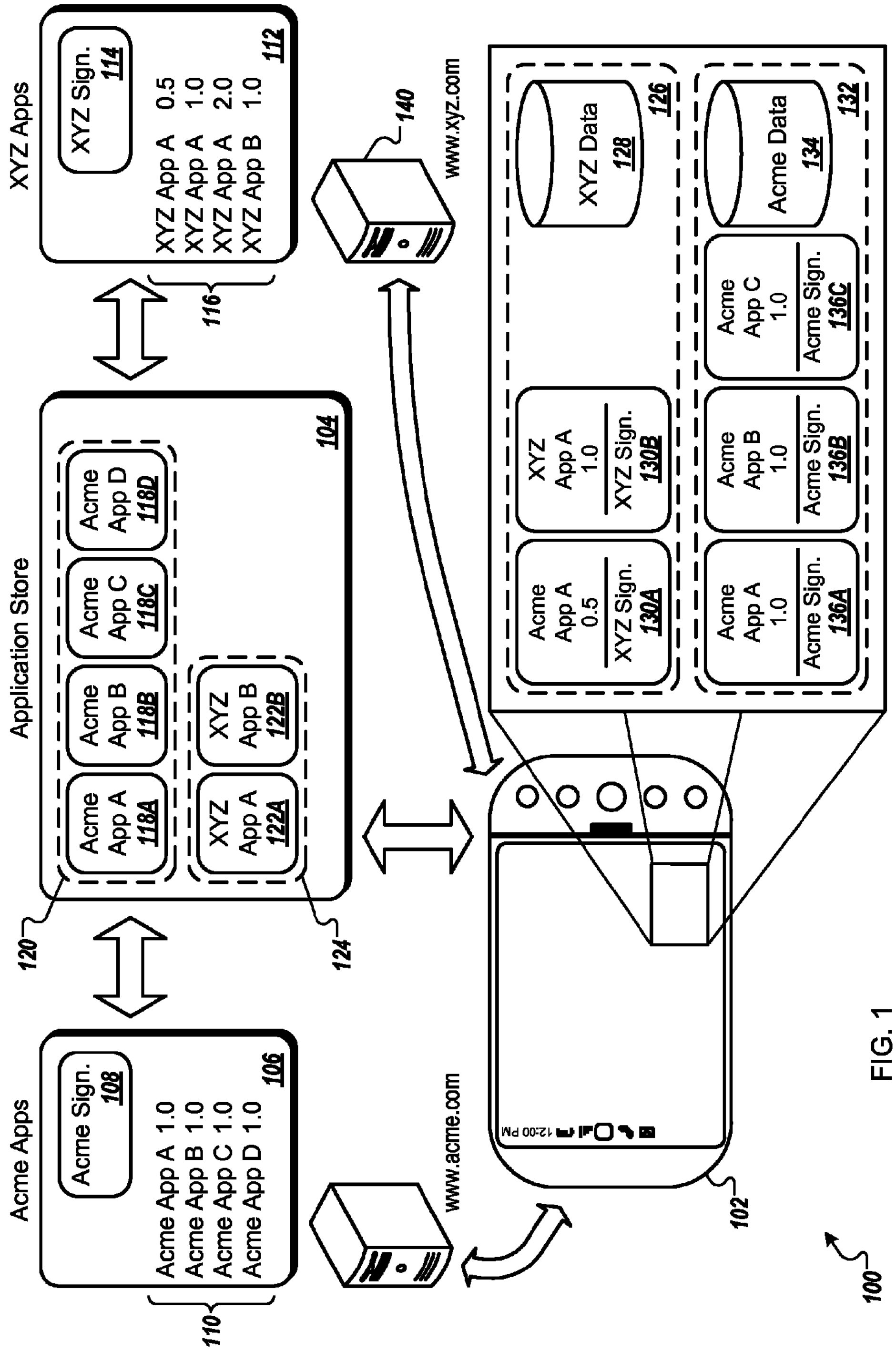
FIG. 1 is a conceptual diagram that shows the submission and use of applications that have been signed using self-signed electronic security certificates.

FIG. 1 is a conceptual diagram that shows the submission and use of applications that have been signed using self-signed electronic security certificates. As shown in FIG. 1, a system 100 enables one or more software developers to provide applications signed using self-signed certificates to a user device 102. For example, the user device 102 may be a smartphone, a personal digital assistant, a notebook, or other similar mobile computing device. Applications may be provided to the user device 102 using a number of wireless and wired networks and protocols, including, but not limited to, GSM (Global System for Mobile communications), CDMA (Code Division Multiple Access), IEEE 802.11, Bluetooth, or via a docking station connected to a personal computer or server, to name a few examples.

The system 100 includes an application store 104 that can be populated with applications that have been submitted by one or more software developers, and can distribute the applications to various computer devices (e.g., the user device 102). For example, a developer 106 (Acme Apps) may submit a suite of applications 110. The applications 110 may represent a grouping of applications configured for interoperability, such as accessing a common data source, passing or sharing data, or providing common functionality, to name a few possibilities. The applications 110 may be signed by the developer 106 with a self-signed certificate signature 108 (Acme Cert.). Additionally, for example, a developer 112 (XYZ Apps) may submit a suite of applications 116. The applications 116 may represent a series of application versions (e.g., XYZ App A, versions 0.5, 1.0, and 2.0) and another application provided by developer 112 (e.g., XYZ App B). The applications 116 may be signed by the developer 112 with a self-signed certificate signature 114 (XYZ Cert.).

Developers may sign software applications using a key and certificate management tool (e.g., Keytool) and a signing tool (e.g., Jarsigner). The certificate management tool enables users to create and administer their own public and private key pairs and certificates. Keytool, for example, can store the keys and certificates in a keystore (i.e., a file) and may protect private keys with a password. To sign an application, for example, developers may run Jarsigner, referencing both an application's package file (e.g., an APK (Android Package) file, a JAR (Java Archive) file, etc.) and the keystore including the private key and certificate with which to sign the application. Various build tools (e.g., Eclipse, Ant, etc.) may integrate and invoke Keytool and Jarsigner to facilitate the application signing process during an application build, for example.

Under some circumstances, a developer may choose to share its private key or certificate with another developer. For example, developer 106 (Acme Apps) may provide certificate 108 (Acme Cert.) to developer 112 (XYZ Apps) and developer 112 may sign one or more of its applications 116 using a certificate to produce signature 108. Thus, one or more applications 116 developed by XYZ Apps could be configured to share resources or otherwise cooperate with one or more applications 110 developed by Acme Apps, for example. However, sharing a private key or certificate with another developer may include an element of risk, as applications signed using the key or certificate may appear to a user or user's device as having originated from the owner of the key or certificate. For example, a malicious software developer in possession of a private key or a certificate owned by Acme Apps could create a software application configured to corrupt or steal device data associated with applications developed by Acme Apps. As another example, the malicious software developer may create a software application configured to damage or overwrite Acme Apps applications.

As shown, the application store 104 may provide a graphical representation such that a user can see various applications grouped by the developer of the applications. For example, the developer 106 (Acme Apps) may provide applications 118A-D to the application store 104, and the applications may be displayed in visual proximity to each other as an application group 120. Similarly, for example, the developer 112 (XYZ Apps) may provide applications 122A-B to the application store 104, and the applications may be displayed in visual proximity to each other as an application group 124. The compiled code for the applications 118A-D in group 120 may be signed by developer 106 (Acme Apps) using certificate signature 108, for example, and the compiled code for the applications 122A-B in group 124 may be signed by developer 112 (XYZ Apps) using certificate signature 114. For example, users of the application store 104 may access and download any of the applications 118A-D and 122A-B.

In some implementations, a graphical interface to the application store 104 may be presented by the device 102 (e.g., on a display screen). For example, the graphical interface may be displayed by an application running on the device 102, such as a web browser or a dedicated application with access to the store 104. The application may use a network connection to a server hosting the store, and may present graphical representations of store contents to the device user, for example. The device user may browse the contents of the store, using a device input such as a touch screen or a track ball, to name two examples. Upon locating one or more desired applications, the device user may select the applications and request to download the applications from the application store 104. For example, the user of device 102 selects Acme App A (118A), Acme App B (118B), Acme App C (118C) and XYZ App A (122A) for download, and the application store 104 transfers the selected application files to the device 102 (e.g., via a wireless connection), where the applications may be stored.

In some implementations, the device 102 can store and manage multiple downloaded applications. For example, two applications created by developer 112 (XYZ Apps) and signed by the developer using self-signed certificate signature 114 (XYZ Cert.) may be stored, applications 130A and 130B. Additionally, for example, three applications created by developer 106 (Acme Apps) and signed by the developer using self-signed certificate signature 108 (Acme Cert.) may be stored, applications 136A, 136B, and 136C.

In some implementations, the device 102 operating system and the downloaded applications can use signatures from self-signed certificates to control application functionality. For example, based on a determination that multiple applications have been signed using a similar self-signed certificate, the operating system can enable the applications to share functionality and data. Applications created by developer 106 (Acme Apps), and signed with matching self-signed certificate signature 108 (Acme Cert.), for example, may be associated with application group 132 and given access to common application data 134 (Acme Data). Correspondingly, applications created by developer 112 (XYZ Apps), and signed with matching certificate signature 114 (XYZ Cert.), for example, may be associated with application group 126 and given access to common application data 128 (XYZ Data). For example, applications and data associated with a group may be considered to operate in a sandbox, sharing access to common functionality and data with each other, but preventing or restricting requests for functionality and data from applications outside of the group.

Applications 136A-C included in the application group 132 represent a suite of applications that may be integrated to provide related or supporting functions, and to maintain (e.g., add, edit, delete) shared application data 134, for example. As another example, applications 136A may represent an extensible parent application, and applications 136B and 136B may represent components used by application 136A. Applications 130A and 130B included in the application group 126 represent two different versions of the same application, for example. A user of the device 102 may have previously downloaded application 130A (XYZ App A, version 0.5), for example, and subsequently downloaded application 130B (XYZ App A, version 1.0). Upon installation of application 130B, for example, the device 102 operating system may detect that a new version (e.g., XYZ App A, version 1.0) of an existing application (e.g., XYZ App A, version 0.5) is present, and that the new version includes a matching self-signed certificate signature as the old version (e.g., XYZ Cert.). Based on such information, for example, the operating system may remove the old version of the application. For example, the operating system may effectively replace application 130A with application 130B, leaving application data 128 untouched. Control of the data 128 may be passed from application 130A to application 130B by the operating system, for example.

To illustrate an example of the system 100 in use, Acme Apps may be a company that makes certain modular applications for the construction industry. For example, one application may be a finance application, another may be a billing application, another an estimating application, another a project planning application, etc. Under certain circumstances, one of the applications may access capabilities of another application, or may access data generated and controlled by another application. For example, the estimating application may provide data related to a generated estimate to the billing application. As another example, the billing application may request accounting functionality from the finance application. As another example, the finance application may request data created by both the estimating application and the billing application to generate a report.

To create the modular applications 110 (e.g., the finance application, billing application, estimating application, project planning application, etc.), the application developer 106 (Acme Apps) may use one or more software development tools, such as Eclipse, Ant, and the like. The developer 106 may generate a compiled version of each of the applications and locally sign each of the applications with the digital certificate signature 108 without assistance from a central certification authority, for example, and may then submit one or more of the self-signed applications 110 to the application store 104. For example, application 118A may represent the finance application, application 118B may represent the billing application, application 118C may represent the estimating application, and application 118D may represent the project planning application.

The user of device 102 (e.g., a construction company owner) may visit the application store 104 online, for example, and select one or more applications for purchase. For example, the user of device 102 may decide to purchase the finance application (118A), billing application (118B), and estimating application (118C) submitted by developer 106 (Acme Apps), and to not purchase the project planning application (118D). Upon purchase, for example, the applications 118A-C may be downloaded and installed by the device 102. For example, application 136A may represent the downloaded and installed finance application, application 136B may represent the downloaded and installed billing application, and application 136C may represent the downloaded and installed estimating application.

As each of the applications 136A-C have been signed by developer 106 (Acme Apps) with certificate signature 108 (Acme Cert.), the device 102 operating system may associate the applications with application group 132 (e.g., a suite of related applications) and may enable the applications to share functionality and data. For example, upon running the estimating application (136C), the user of device 102 may use the application to create a job estimate, and the estimating application may store information related to the estimate in a section of application data 134 (Acme Data). Upon completion of the job, for example, the user of the device 102 may run the billing application (136B). The billing application, for example, may request estimation data from the estimating application (or, alternately may access estimation data directly from application data 234), and may request accounting calculation services provided by the finance application (136A). Interoperability between applications that are included in the suite of Acme applications (applications included in group 132) may be enabled by the device 102 operating system, based on the applications having been signed by Acme Apps with similar self-signed certificates, for example.

As shown, user device 102 may communicate with a server 140 (e.g., a server hosting www.xyz.com) maintained by developer 112 (XYZ Apps). For example, application 130B may be a weather information application, and the application may periodically request weather information updates from the server 140 (e.g., via a wireless Internet connection, SMS packets, etc.). Application services running on server 140 may examine the signatures of device applications requesting information, and may grant or deny information requests based on the signatures created by certificates. For example, as developer 112 (XYZ Apps) has previously signed application 130B using certificate signature 114 (XYZ Cert.), the developer may configure application services running on server 140 to recognize requests from application 130B based on the certificate's signature, and to grant the requests from application 130B based on recognition. Thus, for example, developer 112 (XYZ Apps) may provide weather-related data to device users having purchased and downloaded application 130B.

In some implementations, developer 112 may provide applications or application updates directly to user device 102, bypassing the application store 104. For example, the application 130B may periodically check server 140 for available application updates, and the server 140 may provide the update (e.g., a newer version) based on a determination that the application has been signed using certificate 114 (XYZ Cert.). As another example, the server 140 may provide additional modules or add-on applications associated with the application 130B. For example, developer 112 (XYZ Apps) may create an application that uses or extends the functionality of application 130A (e.g., a mapping component), and may provide the application to user device 102.

Figure 2A:
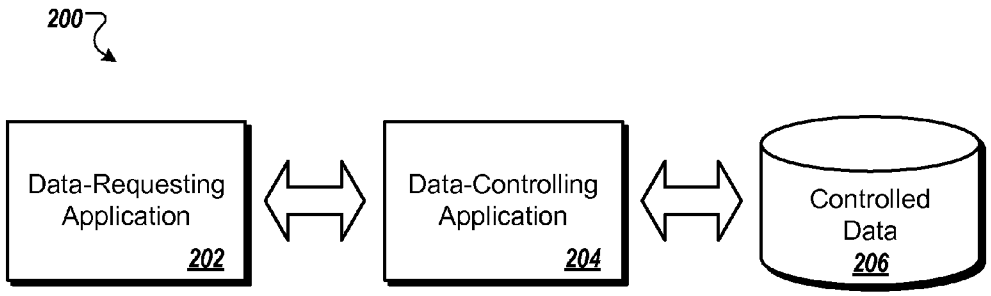
FIG. 2A is a conceptual diagram that shows one application mediating access to data by a second application by the use of signatures from self-signed certificates.

FIG. 2A is a conceptual diagram 200 that shows one application mediating access to data by a second application by the use of signatures from self-signed certificates. As shown, a data-requesting application 202 can request data services (e.g., reading, writing, deleting, etc.) from a data-controlling application 204. The data-controlling application 204 may manage controlled data 206, for example, by providing data services associated with the data 206. For example, the data-requesting application 202 may include dialing capabilities, and may need phone number information associated with the controlled data 206. In the present example, the data-requesting application 202 can request phone number information for a particular contact from the data-controlling application 204 (e.g., a phone directory application). For example, the data-controlling application 204 can compare its own signature to the signature of the data-requesting application 202, and grant the data request after determining a match. Upon granting the data request, for example, the data-controlling application 204 can retrieve the requested data (e.g., a particular phone number) from the controlled data 206, and can provide the data to the data-requesting application 202.

In some embodiments, the match for the signatures from the certificates need not be exact, but rather enough of a match to demonstrate that the applications were signed by the same entity (e.g., a developer). For example, a particular signature created by a certificate may include an identifier having 128 bits, the first 64 of which may be used to identify the signing entity, and the other 64 of which may identify a particular compile generated by the entity.

Figure 2B:
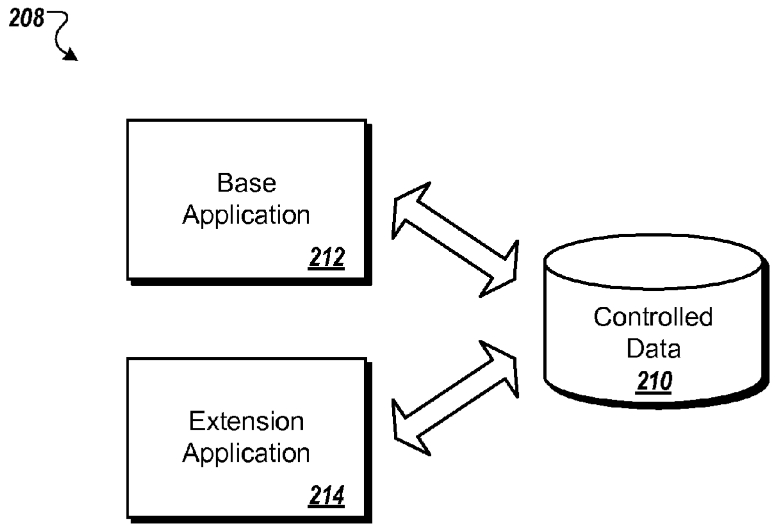
FIG. 2B is a conceptual diagram that shows an operating system mediating access to data by two different applications by the use of signatures from self-signed certificates.

FIG. 2B is a conceptual diagram 208 that shows an operating system mediating access to data by two different applications by the use of signatures from self-signed certificates.

As shown, both a base application 212 and an extension application 214 can request data services (e.g., reading, writing, deleting, etc.) relating to controlled data 210 from the operating system. For example, the base application 212 and the extension application 214 may be applications that belong to a suite of applications that were created by the same developer (or related developers), signed with signatures from the same (or a similarly owned) certificate. A data request by either the base application 212 or the extension application 214 can be granted or denied by the operating system, for example, based on certificates and corresponding signatures associated with the applications. In some implementations, data access can be provided at different levels. For example, interfacing with the operating system, the base application 212 may define various access levels available to itself and one or more extension applications. In the present example, the base application 212 may declare full data access (e.g., reading, writing, deleting, etc.) for itself, and limited data access (e.g., reading) for extension applications including a matching certificate and corresponding signature (e.g., extension application 212).

In some implementations, to manage interoperability between applications, a system using self-signed certificates for generating signatures may be combined with a permission-based system for controlling application functionality. In such a system, functional permissions may be declared and requested by applications. To specify and control application functionality provided to other applications, for example, functional permissions may be declared and defined by the providing application. The permission declaration may include information related to which other applications may be granted functional permissions, such as applications signed with a similar certificate or a trusted certificate. The declaration may be made in a file (e.g., a manifest file) associated with an application package, for example. To use one or more functions offered by another application, for example, permission requests may be specified (e.g., in the manifest file) by the application requesting the functions.

Upon application installation, for example, functional permission requests may be granted or refused. For example, based on a check against the signature of the application requesting functional permissions from another application, an operating system may grant or refuse the permission request. As another example, a device user may be presented with an option to either grant or refuse permissions requested by the application. For example, upon application installation, the operating system may present a user with a message informing the user of the identity of the developer of the application (e.g., Acme Apps) and various functions requested by the application (e.g., access of data provided by XYZ Apps, messaging services, camera services, etc.). If a permission request is granted by the user, for example, the operating system may allow the application to use the requested functions without prompting the user in the future, using the self-signed certificate signature. If a permission request is refused, for example, the operating system may disallow an attempt by the application to use the requested functionality without prompting the user.

Permissions may be enforced at a number of points of program operation. For example, permissions may be enforced at the time of a call into a system, to prevent an application from executing certain functions. As another example, permissions may be enforced when starting an application activity, to prevent applications from launching activities of other applications. As another example, permissions may be enforced when sending and receiving broadcasts (e.g., messages between applications), to control which applications can receive broadcasts from the sending application, and to control which applications can send broadcasts to the receiving application. As another example, permissions may be enforced when accessing and operating on a data provider or a service.

Figure 3:
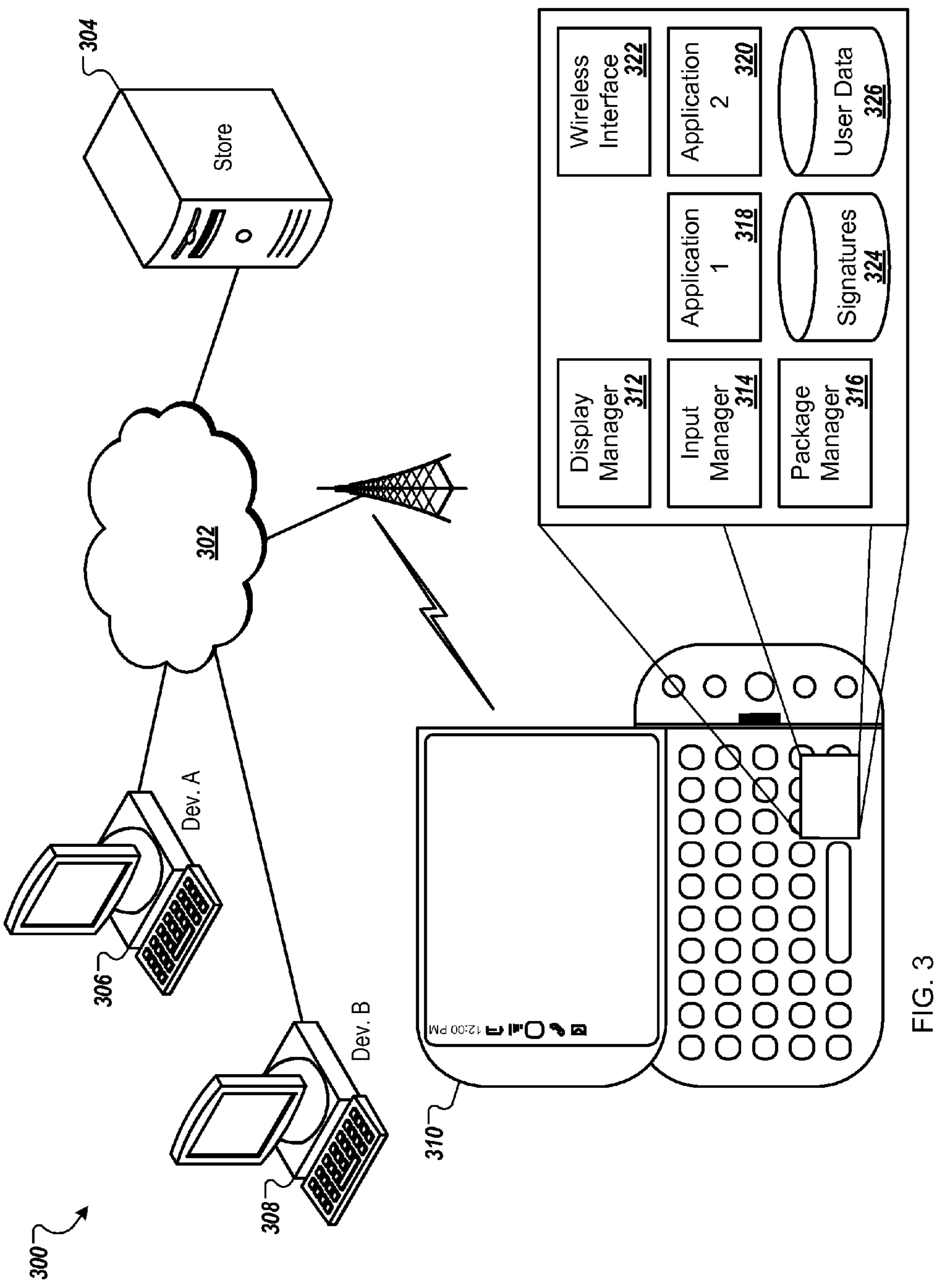
FIG. 3 is a schematic diagram of a system for controlling access to computer resources using computer applications having signatures from self-signed certificates.

FIG. 3 is a schematic diagram of a system 300 for controlling access to computer resources using self-signed computer applications having signatures from self-signed certificates. Using the system 300, for example, one or more developers may create and locally sign applications without assistance from a central certification authority. Self-signed applications from the same developer or from cooperating developers may be configured to share and provide each other with functional and data services.

The system 300 may include a plurality of application developers, application stores, and user devices, in communication with each other via a network 302 (e.g., a cell phone carrier network, the Internet, etc.). For example, the system 300 may include application developer A 306 and application developer B 308. The application developers 306, 308 may employ computer devices (e.g., workstations, servers, etc.) running various software application development environments (e.g., Eclipse, Ant, etc.) to generate compiled versions of software applications for distribution. Using one or more third-party certificate-generating and application signing applications resident on the same computer as the compiled applications, for example, the application developers 306, 308 may create their own certificates and sign their own applications. To sign the compiled software applications, for example, the application developers may select a signing option from the application development environment. For example, software applications generated by the application developers 306, 308 may be signed after being compiled.

The system 300 may also include an application store 304. For example, the application store 304 may be a server (or a group of servers) for hosting and distributing applications provided by one or more application developers. The store 304 may be accessible online, for example, via a cell phone network, the Internet, or another wireless network. Application developers 306, 308 may submit compiled and signed versions of software applications to the application store 304. Submitted applications may be made available by the application store 304 to one or more user devices.

The system 300 may also include a user device 310. For example, the device 310 may be a smartphone, a personal digital assistant, a notebook, or other similar mobile computing device. A user of the device 310 may access the application store 304, for example, to browse, select, purchase, and download applications submitted to the store by various application developers. A number of components within device 310 may be configured to provide functionality related to obtaining applications from the application store 304, for example, and installing, storing, and running the applications once the applications have been obtained.

One such component of the device 310 is a display manager 312, which may be responsible for rendering content for presentation on device 310 (e.g., on the device display screen). The display manager 312 may receive graphic-related content from a number of sources and may determine how the content is to be provided to a user. For example, a number of different windows for various device applications may need to be displayed, and the display manager 312 may determine which to display, which to hide, and what to display or hide when there is overlap between various graphical objects. The display manager 312, for example, can present to the device user an interface associated with the application store 304.

An input manager 314 may be responsible for translating commands provided by a user of device 310. For example, such commands may come from a keyboard, from a touch screen, from a trackball, or from other such sources, including dedicated buttons or soft buttons (e.g., buttons whose functions may change over time, and whose functions may be displayed on areas adjacent to the particular buttons). The input manager 314 may determine, for example, in what area of the device display commands are being received, and thus in what application being shown on the display the commands are intended for. In addition, it may interpret input motions on the touch screen into a common format and pass those interpreted motions (e.g., short press, long press, flicks, and straight-line drags) to the appropriate application. The input manager 314 may also report such inputs to an event manager (not shown) that in turn reports them to the appropriate modules or applications. The input manager 314, for example, can enable the user to interact with the interface associated with the application store 304. For example, interactions with the interface may be interpreted by the input manager 314, enabling the user to browse, select, and purchase applications from the store 304.

A wireless interface 322 manages communication with a wireless network, which may be a data network that also carries voice communications. The wireless interface 322 may provide for communication by the device 310 with messaging services such as text messaging, e-mail, and telephone voice mail messaging. In addition, the wireless interface 322 may support downloads and uploads of content and computer code over a wireless network such as a cell phone network or the Internet. For example, the wireless interface 322 can enable the user to download one or more applications (e.g., applications 318 and 320) from the application store 304. As another example, the wireless interface 322 can enable applications running on the device 310 to request and receive application services from a provider over the network 302.

Applications 318, 320 may be installed, stored, and executed on the device 310. For example, the applications 318, 320 may take a variety of forms, such as commercial applications, custom applications, mapping applications, e-mail and other messaging applications, music and video players, and various applications running within a web browser or running extensions of a web browser. The applications 318, 320, for example, may include certificates signed by their creators (e.g., application developers 306, 308).

A package manager 316 mediates access of device applications to functionality and data, using certificates. For example, functionality provided by the device 310 operating system, or functionality provided by applications residing on the device, may be granted or denied by the package manager 316. As another example, access to data associated with device applications may be granted or denied by the package manager 316. If an application requests access to a functional or data service provided by the operating system or another application, for example, the package manager 316 may examine the signatures of the requesting and providing applications, and grant the request (e.g., based on a match) or deny the request (e.g., based on a mismatch). For example, certificate-created signatures 324 associated with one or more device applications (e.g., applications 318, 320) may be extracted from the applications by a package parser (not shown) working with the package manager 316. The certificate-created signatures may be extracted and examined by the package manager 316, for example, upon installation, upon a functional request, or upon another event relevant to the granting or denial of application permissions.

To illustrate an example of the package manager 316 in use, application 318 may request to access user data 326 that is controlled by application 320. For example, the package manager 316 may use a package parser (not shown) to extract certificates used to sign the requesting application 318 to create signatures 324 and the controlling application 320. If the package manager 316 determines a match, for example, permission to access user data 326 may be granted to the requesting application 318 by the manager service. As another example, if the package manager 316 determines a mismatch, permission to access user data 326 may be denied by the manager service.

Figure 4A:
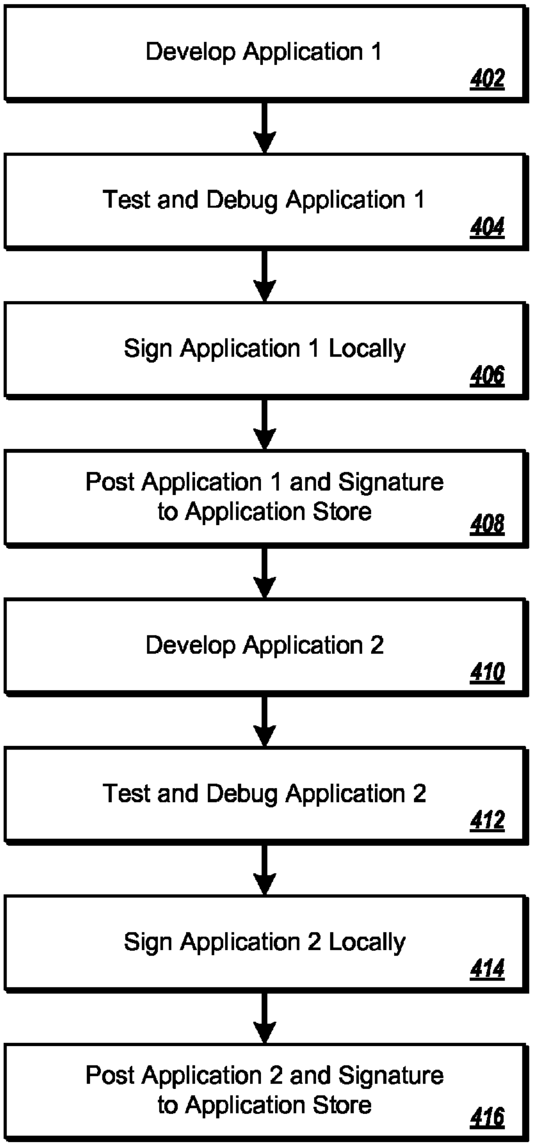
FIG. 4A is a flowchart of a process for developing and posting computer applications having signatures from self-signed certificates.

FIG. 4A is a flowchart of a process for developing and posting self-signed computer applications having signatures from self-signed certificates. For example, the process may be performed by the system 100 shown in FIG. 1, or by the system 300 shown in FIG. 3.

The process begins at box 402, where an application (e.g., a first application) is developed. For example, an application developer can use a variety of software development environments (e.g., Eclipse, Ant, etc.) to code and develop the application on a development computer. The application may include user interface elements, functional services, requests for services, and the like. The application may also include one or more supporting files (e.g., manifest files, resource files, data files, etc.).

At box 404, the application is tested and debugged. For example, using available tools in the software development environment, the application developer can verify that the software performs to specifications. Debuggers may be used to isolate faults, and device emulators may be used to demonstrate application functionality, for example. Upon completion of testing and debugging, for example, a version of the application may be compiled on the development computer using build tools in the development environment.

At box 406, the application is signed locally. For example, a third-party application (e.g., keystore) may be used to generate a certificate on the development computer, and another third-party tool (e.g., jarsigner) may be used to sign the compiled application with the generated certificate. The third party signing tools may be integrated in the software development environment, for example, and may be invoked by selecting a signing option.

At box 408, the application and certificate-signed signature is posted to an application store. For example, the application may be made available for download by mobile devices accessing the store via a network application. Downloaded applications may then be installed, stored, and executed by the devices.

The previously described process steps may be repeated for one or more additional applications. For example, at box 410, a second application is developed. The second application may be developed by the same developer who developed the application described at box 402, for example.

At box 412, the second application is tested and debugged, and at box 414, the second application is signed locally. For example, the second application may be signed using the same certificate from box 406. As a result of having been signed with the same certificate, for example, both the first and second compiled and signed applications may be associated with matching identifiers.

At box 416, the second application and certificate-signed signature is posted to an application store. For example, the second application may be downloaded, installed, and executed by a device having previously downloaded, installed, and executed the first application, and the applications may be identified as having been created by the same application developer.

Figure 4B:
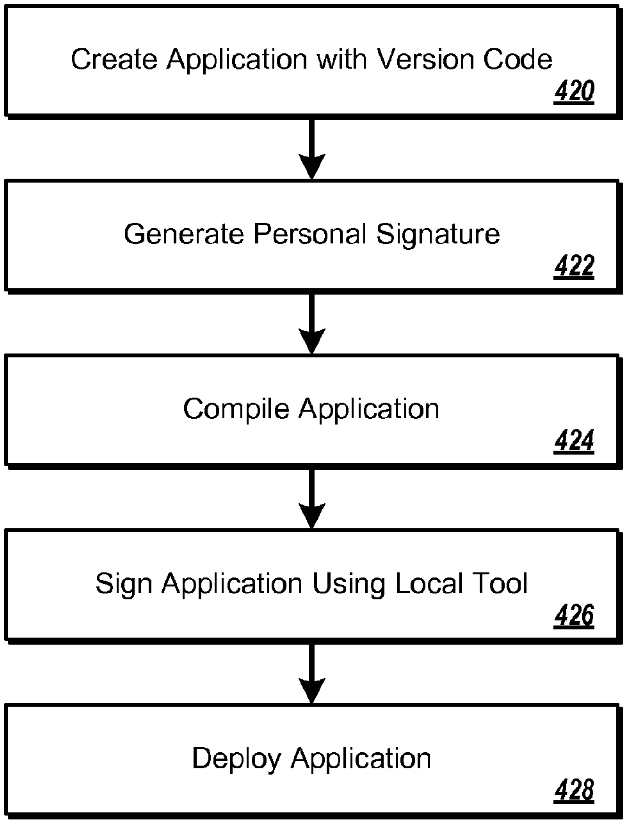
FIG. 4B is a flowchart of a process for developing and posting a computer application have a signature from a self-signed certificate.

FIG. 4B is a flowchart of a process for developing and posting a self-signed computer application having a signature from a self-signed certificate. For example, the process may be performed by the system 100 shown in FIG. 1, or by the system 300 shown in FIG. 3.

The process begins at box 420, where an application is created with a version code. For example, the application may be created by a software developer using a variety of software development environments (e.g., Eclipse, Ant, etc.). Application users, other applications, and publishing services may use application versioning information. For example, users may use the information to determine which application version is installed on their devices, and to determine whether an application update is available. Other applications, for example, may use the information to determine compatibility and to identify dependencies. Publishing services, for example, use the information to determine compatibility and to establish upgrade/downgrade relationships. Versioning information, for example, may be included in an application manifest file, accessible using a tool provided by the development environment. Generally, to publish an application to an application store, the manifest file includes attributes such as version code, version name, and application name. The manifest file may, for example, employ the XML format. For illustrative purposes, a sample XML manifest file format including version information is displayed here.

```
<manifest xmlns:android="http://schemas.android.com/apk/res/android"
  package="net.example.MyApp"
  android:versionCode="1"
  android:versionName="1.0.0">
  <uses-sdk android:minSdkVersion="1" />
  <application android: icon="@drawable/icon"
    android:label="@string/app_name">
    <activity android:name=".MyApp"
        android:label="@string/app_name">
      <intent-filter>
        <action
android:name="android.intent.action.MAIN" />
        <category
android:name="android.intent.category.LAUNCHER" />
      </intent-filter>
    </activity>
  </application>
</manifest>
```

For example, the android:versionCode attribute represents the application version number. For application revisions, for example, the associated value may be incremented, in order to enable users, other applications, and publishing services to differentiate between versions.

At box 422, a personal certificate is generated. For example, personally-generated certificates may be used to sign created applications, instead of signing the applications using digital certificates purchased from a certificate authority. To prepare for signing an application, for example, a developer may obtain a private key. The private key may represent the entity to be identified with the signed application, for example. Additionally, for example, the private key may include a validity period to exceed the expected lifespan of the application or application suite to be signed. The private key may be obtained by a developer using a key generation tool such as keytool. For example, to generate a self-signed key with keytool, the keytool command may be invoked, passing desired options (e.g., generating a key pair including public and private keys, an alias for the key, an algorithm such as DSA (Digital Signature Algorithm) and RSA, and a name identifying the key generator, etc.). As a security precaution, for example, a password for the key may not be included in the keytool command line. If a password is not supplied at the command line, keytool can prompt the developer to enter the password. For illustrative purposes, a sample keytool command line for generating a private key is displayed here.

keytool -genkey -v -keystore myKeystore.keystore -alias myAlias -keyalg RSA -validity 10000

Running the example keytool command line, keytool prompts for passwords for the keystore and key, and prompts for an identifying name. Keytool then generates a keystore as a file entitled "myKeystore.keystore". The keystore and private key may be protected by the entered passwords, for example. The keystore in this example contains a single private key, valid for 10000 days. The alias (e.g., "myAlias") in this example is a name that may be used later to refer to the keystore when signing an application.

At box 424, the application is compiled. For example, a build tool associated with the software development environment may be invoked, and the application code and supporting files (e.g., manifest files, resource files, data files, etc.) may be used to create an application package file (e.g., a .apk file, a .jar file, etc.) on the development computer.

At box 426, the application is signed using a local tool. For example, jarsigner may be used to personally sign the application (i.e., the created application package file) for release. To sign the application, for example, jarsigner may be run on the development computer hosting the application and hosting the keystore containing the previously generated private key (refer to box 422). The jarsigner may be invoked, for example, referencing both the application's package file and the keystore containing the private key with which to sign the package file. For illustrative purposes, a sample jarsigner command line for generating a private key is displayed here:

jarsigner -verbose -keystore myKeystore.keystore myApplication.apk alias_name

Running the example jarsigner command line, jarsigner prompts for passwords for the keystore and key. The jarsigner then modifies the application package file in place, for example, and the application is signed. Optionally, the application package file may be signed multiple times with different keys.

At box 428, the application is deployed. For example, the compiled and signed application may be published to an application store using a network connection, and the application may be made available for selection, purchase, and download by one or more mobile device users.

Figure 4C:
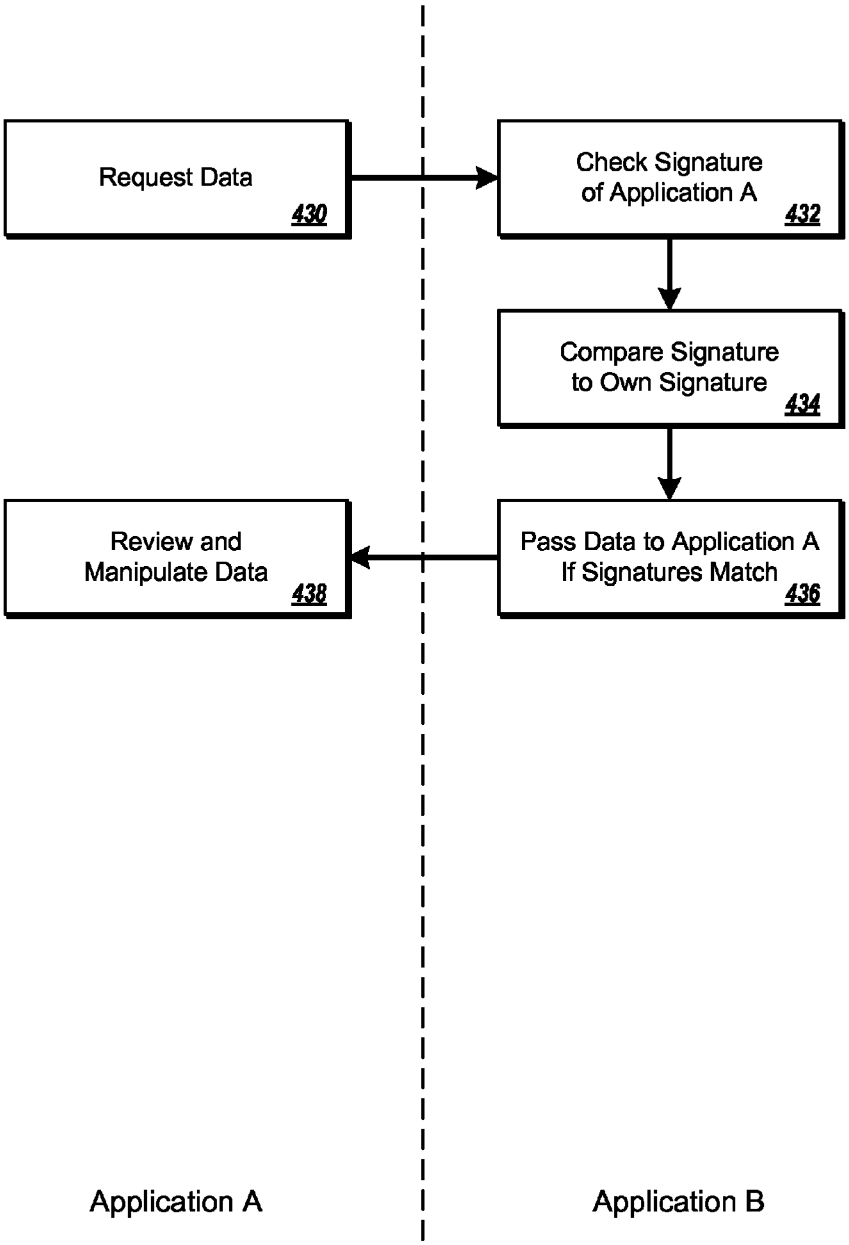
FIG. 4C is a flowchart of a process for controlling access to data by a first application, as mediated by a second application.

FIG. 4C is a flowchart of a process for controlling access to data by a first application, as mediated by a second application. For example, the process may be performed by the system 100 shown in FIG. 1, or by the system 300 shown in FIG. 3.

At box 430, Application A requests data from Application B. For example, Application B may control sensitive user data such as private e-mail addresses, and may be configured to provide the data to trusted applications and to protect the data from being accessed by potentially malicious applications.

At box 432, Application B checks the signature of Application A. For example, Application B may invoke a package manager service or a package parser (e.g., refer to FIG. 3) to access information related to the Application A's signature.

At box 434, Application B compares Application A's signature to its own signature, and at box 436, Application B passes data to Application A if the signatures match. For example, by comparing the signatures, Application B may determine that Application A has been signed by the same application developer as Application B, or by another trusted developer.

At box 438, Application A reviews and manipulates the data provided by Application B. For example, Application A may use an e-mail address provided by Application B to create and send an e-mail message.

Figure 4D:
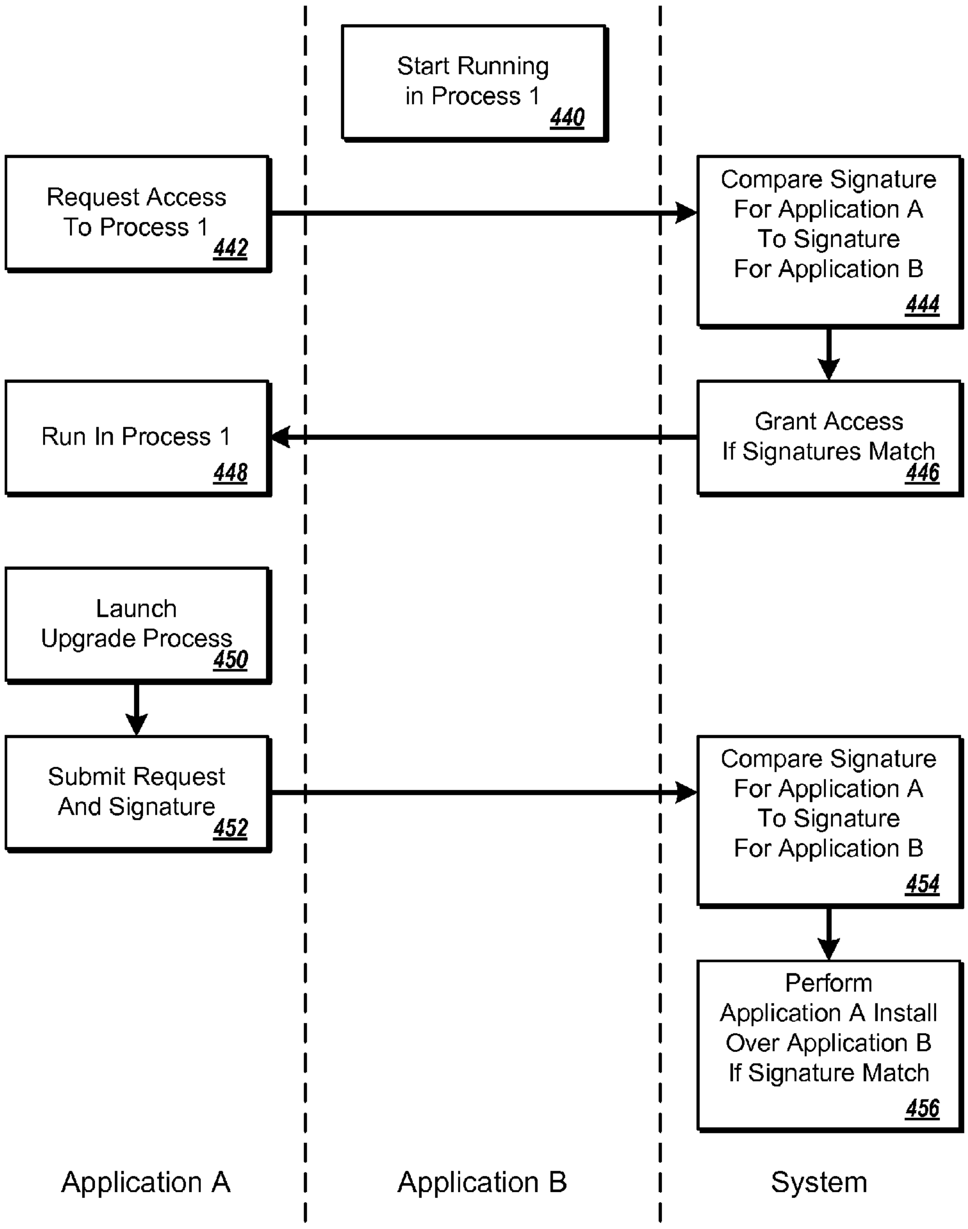
FIG. 4D is a flowchart of a process for controlling access to resources by a first application relative to a second application, as mediated by one or more operating system components.

FIG. 4D is a flowchart of a process for controlling access to resources by a first application relative to a second application, as mediated by one or more operating system components. For example, the processes may be performed by the system 100 shown in FIG. 1, or by the system 300 shown in FIG. 3.

For illustrative purposes, the top portion of the flowchart shows the operating system mediating access to application functionality or data. At box 440, Application B starts running in a process. For example, Application B may be a base application in a suite of applications, or may provide functionality (e.g., mapping services, dialing services, messaging services, etc.) or data usable by one or more other applications.

At box 442, Application A requests access to the process. For example, the request may be made to a device operating system that controls which applications may run in separate processes, and which applications may run in the same process.

At box 444, the system (i.e., the operating system) compares Application A's signature to Application B's signature . For example, the System may invoke a package manager service or a package parser (e.g., refer to FIG. 3) to access information related to both Application A's signature and Application B's signature.

At box 446, the system grants Application A access to run in the same process as Application B if the signatures match. For example, the system may determine that Application A and Application B belong to the same suite of applications, and are signed by the same application developer. As another example, the system may determine that Application B trusts Application A's certificate and signature, and is willing to grant full or limited permissions to Application A. If the signatures (and by extension, the certificates that created the signatures) are determined not to match, for example, the system may prevent the Application A from running in process B, and may instantiate Application A in a different process.

At box 448, Application A runs in the same process as Application B. For example, the system may instantiate Application A in Application B's process. In some implementations, Application A and Application B may be essentially merged, sharing common functionality and data.

For illustrative purposes, the bottom portion of the flowchart shows the operating system mediating an upgrade process. At box 440, Application A launches an upgrade process. For example, Application A may be the most recent version of an existing application, as released by an application developer.

At box 452, Application A submits a request to update an earlier version the application that may exist on a device, and submits its certificate. Optionally, Application A may submit its version information (e.g., as included in a manifest file).

At box 444, the system (i.e., the operating system) compares Application A's certificate to Application B's certificate. For example, the System may invoke a package manager service or a package parser (e.g., refer to FIG. 3) to access information related to both Application A's certificate and Application B's certificate.

At box 456, if the certificates match, the system performs an installation of Application A over Application B. For example, the system may determine that Application A is a newer version of Application B, and upon installation of Application A, may remove Application B and transfer Application B's functional and data privileges to Application A.

Figure 5:
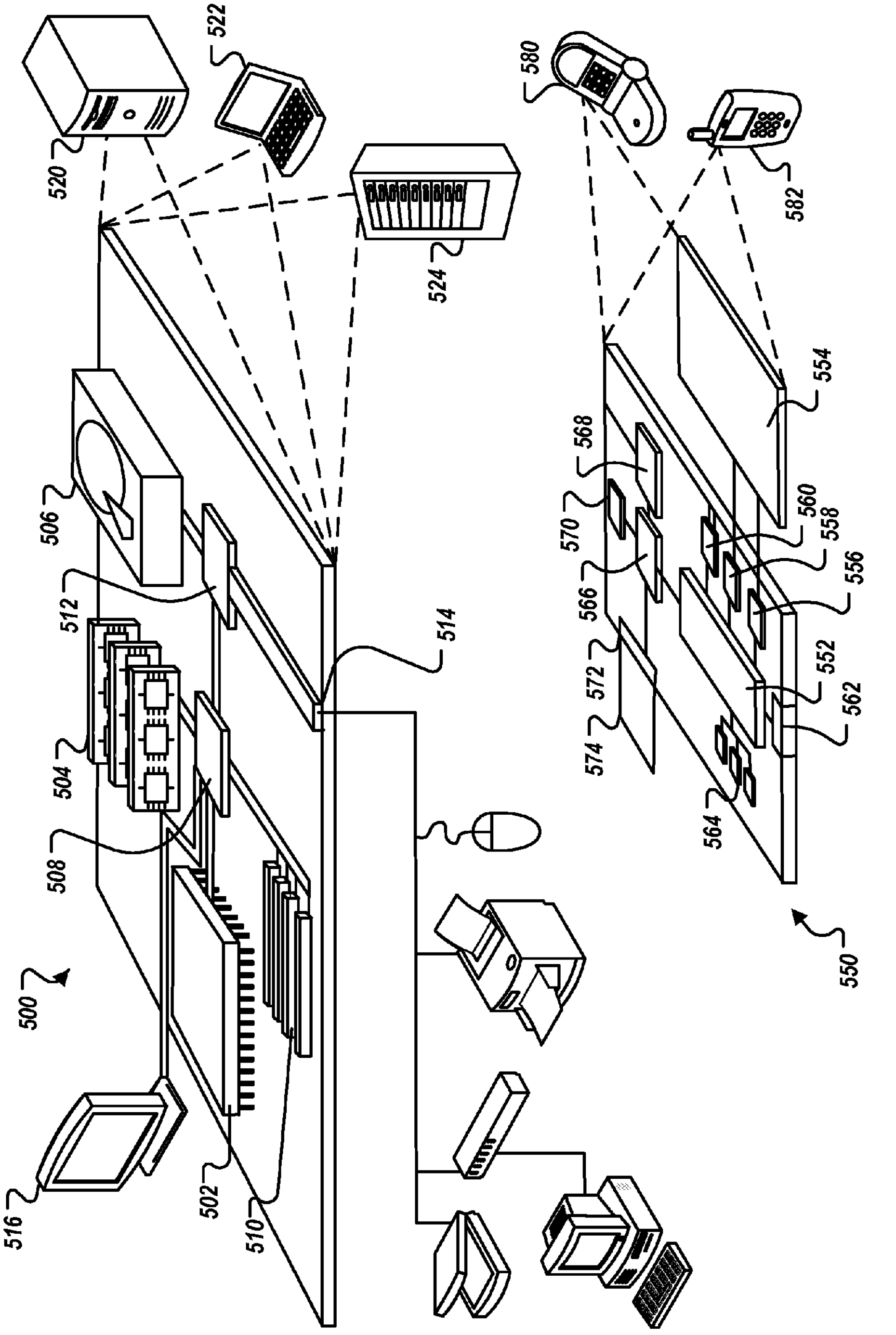
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interface may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the certification systems and methods have been described, it should be recognized that numerous other applications are contemplated. Accordingly, other embodiments are within the scope of the following claims.

What is claimed is:

1. A computer-implemented method for signing computer applications, the method comprising:

generating a compiled version of a first software application;

signing the first software application with a digital certificate locally to a developer of the first software application without assistance from a central certification authority, the digital certificate associated with a validity period for which the digital certificate is valid for signing software applications;

submitting the signed first software application to an online application store, wherein the certificate is self-signed by the developer or a person in cooperation with the developer other than a central authority for providing certificates;

generating a compiled version of a second software application;

signing the second software application with the digital certificate locally to the developer of the first software application without assistance from a central certification authority; and submitting the signed second software application to the on-line application store, wherein the first software application includes code to determine whether the digital certificate for the first software application matches the digital certificate for the second software application, and to limit access to data controlled by the first software application to the second software application based on the match.

2. The computer-implemented method of claim 1, wherein signing the first software application comprises selecting a signing option from an application development environment.

3. The computer-implemented method of claim 1, wherein signing the first software application comprises signing the first software application using a third party certificate-generating application that is resident on the same computer as the first software application.

4. The computer-implemented method of claim 1, further comprising generating a second compiled version of the first software application, signing the second compiled version of the first software application using the digital certificate, and submitting the second compiled version of the first software application to the on-line application store.

5. The computer-implemented method of claim 4, wherein the second compiled version of the first software application has an identifier that matches an identifier for the first compiled version of the first software application.

6. A computer-implemented method for controlling access to computer resources using computer applications signed using one or more self-signed certificates, the method comprising:

instantiating a first application in a first process on a computing device;

receiving a request to instantiate a second application in the first process;

determining whether the first application and the second application were signed by the same self-signed electronic certificate that was created without assistance from a certifying authority, the electronic certificate associated with a validity period for which the electronic certificate is valid for signing applications;

allowing access to data controlled by the first application and running the second application in the process if the first application and the second application are determined to have been signed by the same self-signed electronic certificate;

generating a compiled version of the second application; and submitting the signed second software application to the on-line application store.

7. The method of claim 6, further comprising preventing the second application from running in the process if the first application and the second application are determined to not have been signed by the same self-signed electronic certificate.

8. The method of claim 6, wherein running the second application in the process comprises upgrading the first application to the second application while maintaining data that is accessible only to applications that have been signed with the certificate.

9. The method of claim 6, wherein access to the process is controlled by a management component of an operating system operating on a device that hosts the process.

10. The method of claim 6, further comprising determining whether the first application has declared functional permissions for the first process, wherein running the second application in the process further comprises determining whether the second application has been granted functional permissions for the process.

11. The method of claim 10, wherein granting functional permissions is performed by a user upon installation of the second application.

12. A computing system having structures for controlling access to computer resources using computer applications signed using self-signed certificates, the system comprising:

one or more computer applications each signed with a self-signed security certificate and stored on a computing device, the security certificate associated with a validity period for which the security certificate is valid for signing the one or more computer applications; and an operating system operable on the computing device to provide resources for executing the one or more computer applications, wherein the operating system includes one or more components programmed to:

control access by a first application to resources controlled by a second application based on the presence of a match between electronic security certificates with which the first and the second application are signed;

determine whether the first application and the second application were signed by the same self-signed electronic certificate that was created without assistance from a certifying authority, and to allow the second application to run in a process assigned to the first application only if the first application and the second application are determined to have been signed by the same self-signed electronic certificate; and permit the second application to run in the process to upgrade and remove the first application while maintaining data that is accessible only to applications that have been signed with the certificate.

13. The system of claim 12, wherein the one or more components are programmed to permit the first application and the second application to run in the process simultaneously.

14. The system of claim 12, wherein the match is partial.

15. The system of claim 12, wherein access by the first application to resources controlled by the second application is enforced without prompting a user of the computing device.

16. A computing system having structures for controlling access to computer resources using computer applications signed using self-signed certificates, the system comprising:

one or more computer applications each signed with a self-signed security certificate and stored on a computing device, the security certificate associated with a validity period for which the security certificate is valid for signing the one or more computer applications;

one or more data stores repositories storing data accessible by the one or more computer applications; and an operating system that includes one or more components for:

controlling access to computer resources by determining whether a first application of the one or more computer applications is signed with a self-signed electronic security certificate that matches a self-signed security certificate of a second application;

determining whether the first application and the second application were signed by the same self-signed electronic certificate that was created without assistance from a certifying authority, and to allow the second application to run in a process assigned to the first application only if the first application and the second application are determined to have been signed by the same self-signed electronic certificate; and permitting the second application to run in the process to upgrade and remove the first application while maintaining data that is accessible only to applications that have been signed with the certificate.

* * * * *